June 19, 1928.  1,673,813
O. EDELMANN
CLAMPING DEVICE
Filed Sept. 6, 1924
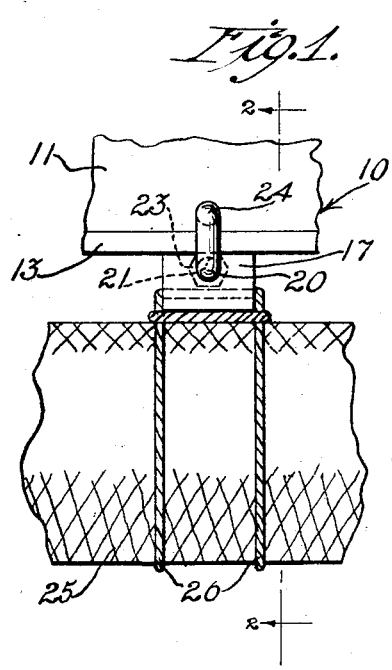
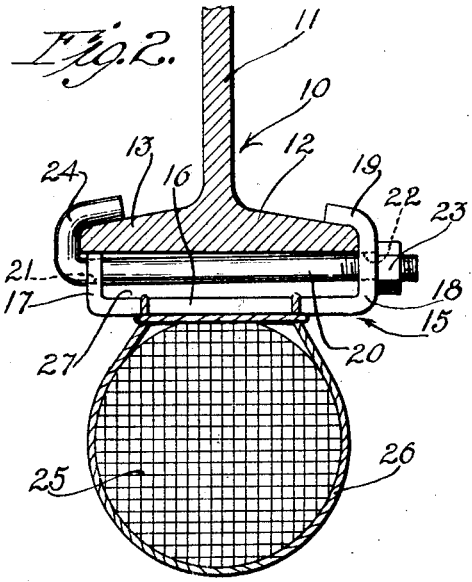
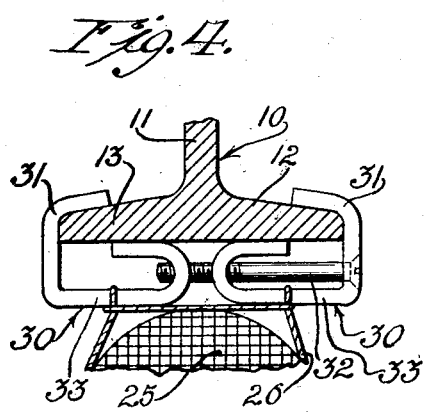
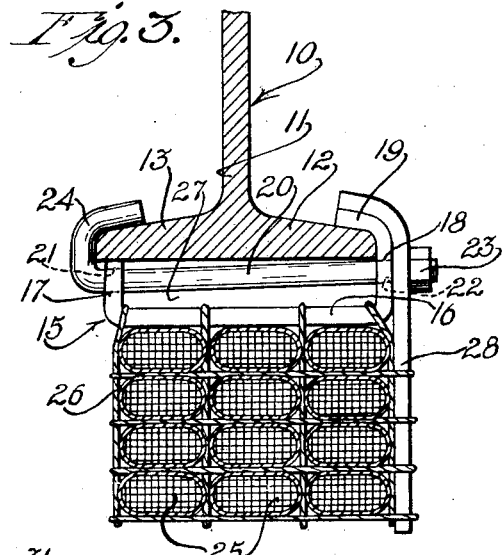
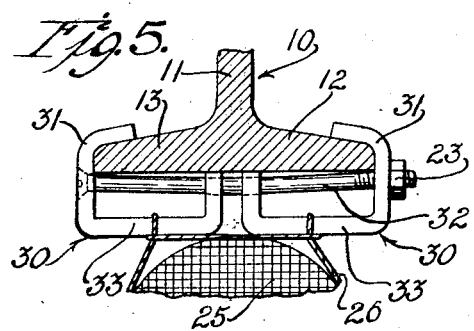
Inventor
Otto Edelmann Patented June 19, 1928.

1,673,813

UNITED STATES PATENT OFFICE.

OTTO EDELMANN, OF OAK PARK, ILLINOIS, ASSIGNOR TO WESTERN ELECTRIC COMPANY, INCORPORATED, OF NEW YORK, N. Y., A CORPORATION OF NEW YORK.

CLAMPING DEVICE.

Application filed September 6, 1924. Serial No. 736,256.

This invention relates to clamping devices, and more particularly to a device for securing strands or cable to supports therefor.

The object of this invention is to provide an improved clamping device for securing a cable to a support, which is adjustable, simple in construction, and which may be readily attached to the support at any point thereon.

Other objects and advantages will appear as the description of the invention progresses and the novel features of the invention will be particularly pointed out in the appended claims.

The invention is illustrated in the accompanying drawings, in which:

Fig. 1 is a side elevation of a preferred form of the improved clamping device, illustrating its use for securing a cable to an I-beam support;

Fig. 2 is a section taken on the line 2—2 of Fig. 1;

Fig. 3 is a section similar to Fig. 2, illustrating the improved clamping device applied to securing a plurality of cables to an I-beam support, and Figs. 4 and 5 illustrate modified forms of the improved clamping device.

The invention is herein illustrated and described as applied to securing a cable to an I-beam support, but it should be understood that is is capable of other applications as set forth in the appended claims.

Referring now to the drawings in detail, and particularly to Figs. 1 and 2 thereof, the reference numeral 10 indicates a portion of an I-beam which is frequently used for supporting cables in telephone exchanges and which comprises a web portion 11 and flanges 12 and 13. A channel member 15, comprising a web portion 16 and end flanges 17 and 18 is formed from a suitable length of flat iron of a convenient width. The end of the flange 17 presses on the face of the I-beam 10 near the end of the flange 13 thereof, and the end flange 18 is bent to conform to the shape of the flange 12 thereby forming a jaw portion 19. A bolt 20 is inserted through apertures 21 and 22 in the end flanges 17 and 18 respectively, and is threaded at one end to receive a nut 23. A jaw portion 24 is formed at the other end of the bolt 20 and is adapted to engage the flange 13 of the I-beam 10. It is apparent from an inspection of Fig. 2 that by turning the nut 23 in a clockwise direction, the jaws 19 and 24 are drawn towards each other thereby firmly gripping the flanges 12 and 13.

A cable 25 is supported against the outer surface of the web portion 16 of the channel member 15 and is laced or sewed thereto by a strand 26 of thread cord or other suitable material. A space, indicated by the reference numeral 27, is provided between the bolt 20 and the web portion 16 to facilitate sewing the cable thereto. As clearly shown in the drawings the cable 25 may be fastened at any point along the web portion 16 of the member 15, and may thereby assume a plurality of positions with respect to the I-beam 10.

Referring to Fig. 3, wherein the improved clamping device is illustrated as used for supporting a plurality of small cables, such as are frequently used in wiring telephone exchanges, a bar 28 is bent at one end to conform to the jaw member 19 and is firmly held between the end flange 18 and the nut 23. The cables 25 may be fastened to both the web 16 and the bar 28 in order to securely maintain them in position.

The modified forms of the improved clamping device, illustrated in Figs. 4 and 5, comprise a pair of complementary members 30 each having a jaw portion 31 adapted to grip the flanges 12 and 13 of the I-beam 10. A bolt 32 serves to draw the jaw members 30 towards each other causing them to firmly grip the flanges 12 and 13. Each member 30 is also provided with a web portion 33 which is suitably spaced from the face of the I-beam and to which the cable 25 is sewed or otherwise fastened.

What is claimed is:

1. A device for securing a strand to an I-beam support, comprising a member having a portion engaging a face of the I-beam, a portion engaging a flange thereof and an intermediate portion spaced from the face of the I-beam for supporting a strand, a second member having a portion engaging the face of said I-beam, said last mentioned portion cooperating with the flange engaging portion of the first member to grip said flange, and a jaw portion formed on the second member and cooperating with the face engaging portion of the first member to grip a second flange of said I-beam.

2. A device for securing a strand to an I-beam support, comprising a member having a portion engaging a face of the I-beam and a portion engaging a flange thereof, said portions having apertures therein for receiving a second member having a portion engaging the face of said I-beam, said last mentioned portion cooperating with the flange engaging portion of the first member to grip said flange, and a jaw portion formed on the second member and cooperating with the face engaging portion of the first member to grip a second flange of the I-beam, and means for moving the flange engaging portions of the members toward each other to cause them to firmly grip the I-beam.

3. A device for securing a strand to an I-beam support, comprising a substantially U-shaped member having an end portion engaging a face of the I-beam and a second end portion engaging a flange thereof, said portions having apertures therein for receiving a bolt member having a portion engaging the face of the I-beam, said last mentioned portion cooperating with the flange engaging portion of the first member to grip said flange, a hook portion formed at the opposite end of said bolt member, said hook portion cooperating with the face engaging portion of the first member to grip a second flange of said I-beam, and a nut threaded upon the face engaging portion of the bolt member for moving the flange engaging portions of the members toward each other to cause them to firmly grip the I-beam.

In witness whereof, I hereunto subscribe my name this 21st day of August A. D., 1924.

OTTO EDELMANN.